(12) United States Patent
Sugarmen et al.

(10) Patent No.: US 6,832,485 B2
(45) Date of Patent: Dec. 21, 2004

(54) METHOD OF AND APPARATUS FOR PRODUCING POWER USING A REFORMER AND GAS TURBINE UNIT

(75) Inventors: Chaim Sugarmen, Mevaseret Zion (IL); Uriyel Fisher, Haifa (IL); Zoltan Bihari, Kiryat Motzkin (IL)

(73) Assignee: Ormat Industries Ltd., Yavne (IL)

( * ) Notice: Subject to any disclaimer, the term of this patent is extended or adjusted under 35 U.S.C. 154(b) by 24 days.

(21) Appl. No.: 09/993,305

(22) Filed: Nov. 26, 2001

(65) Prior Publication Data

US 2003/0097843 A1 May 29, 2003

(51) Int. Cl.[7] .............................. F02C 3/28; F02C 3/34; F02C 6/18; F02C 6/04
(52) U.S. Cl. ..................... 60/780; 60/39.12; 60/39.181; 60/39.52
(58) Field of Search ........................... 60/39.12, 39.52, 60/39.181, 39.182, 780

(56) References Cited

U.S. PATENT DOCUMENTS

| | | | | |
|---|---|---|---|---|
| 3,614,872 A | * | 10/1971 | Tassoney et al. ............. 62/54.2 |
| 3,993,458 A | * | 11/1976 | Antal, Jr. ..................... 48/209 |
| 4,415,339 A | * | 11/1983 | Aiman et al. ............... 48/62 R |
| 4,498,289 A | * | 2/1985 | Osgerby ..................... 60/39.52 |
| 4,899,544 A | * | 2/1990 | Boyd ........................... 60/618 |
| 5,937,652 A | * | 8/1999 | Abdelmalek ................. 60/648 |
| 6,148,602 A | * | 11/2000 | Demetri ..................... 60/39.12 |
| 6,232,352 B1 | * | 5/2001 | Vidalin ....................... 518/700 |
| 6,233,914 B1 | * | 5/2001 | Fisher ........................... 60/780 |
| 6,321,539 B1 | * | 11/2001 | Bronicki et al. ........... 60/641.8 |
| 6,510,695 B1 | * | 1/2003 | Fisher ........................... 60/780 |

FOREIGN PATENT DOCUMENTS

DE 3933285 * 4/1991

* cited by examiner

Primary Examiner—Ted Kim
(74) Attorney, Agent, or Firm—Nath & Associates PLLC; Gary M. Nath; Jerald L. Meyer

(57) ABSTRACT

In accordance with the present invention, apparatus is provided for producing power comprising a reformer for reforming a hydrocarbon material and producing syngas comprising hydrogen, carbon monoxide and carbon dioxide. Furthermore, the apparatus comprises a combustion chamber of a gas turbine unit that receives the syngas and combusts the syngas and produces flue gases comprising carbon dioxide and other gases that are supplied to the gas turbine contained in the gas turbine unit. In addition, the apparatus includes a bottoming cycle unit of a combined cycle power plant that produces power and from which combustion gases exit. A carbon dioxide separator is also included in the apparatus that receives combustion gases exiting the bottoming cycle unit and separates carbon dioxide from the other combustion gases. A compressor is provided that supplies the separated carbon dioxide to the reformer for reforming of the hydrocarbon material. Preferably, according to the present invention, the reformer comprises a solar reformer. In addition, the gas turbine unit includes a compressor that compresses air and also an electric generator coupled to the gas turbine that produces electricity.

20 Claims, 1 Drawing Sheet

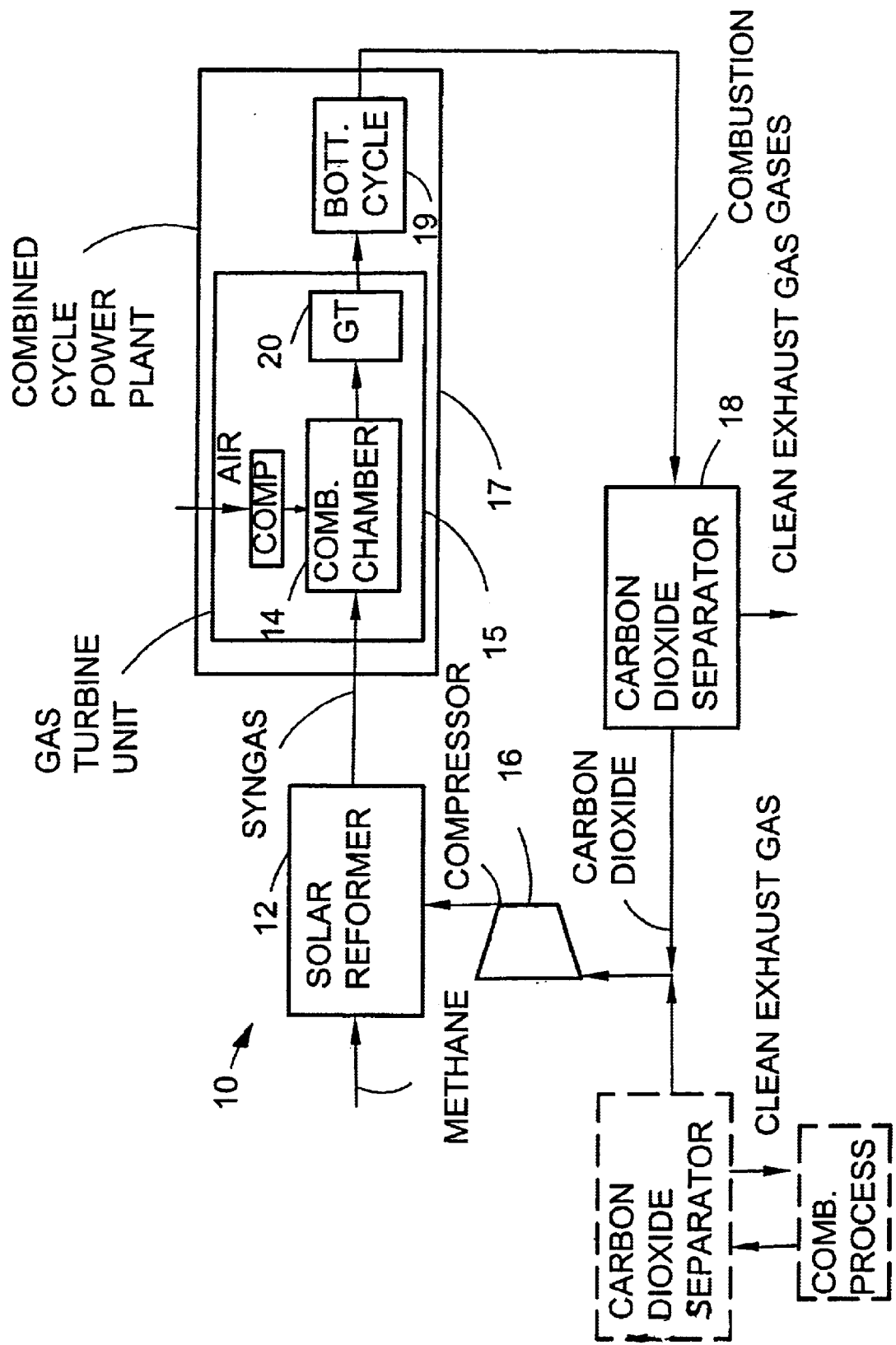

METHOD OF AND APPARATUS FOR PRODUCING POWER USING A REFORMER AND GAS TURBINE UNIT

DESCRIPTION

1. Technical Field

This invention relates to a method of and apparatus for producing power, and more particularly, to a method of and apparatus for producing power from solar energy.

2. Background of the Invention

In recent times the interest in solar energy systems that produce electricity has grown markedly in search for alternative energy sources and also reduction of carbon dioxide emissions. One of the things that have had to be dealt with is low efficiency of converting the solar energy into electricity. Furthermore, these systems still are expensive to construct and maintain.

It is therefore an object of the present invention to provide a new and improved method of and apparatus for providing uninterruptible power wherein the disadvantages as outlined are reduced or substantially overcome.

SUMMARY OF THE INVENTION

In accordance with the present invention, apparatus is provided for producing power comprising a reformer for reforming a hydrocarbon material and producing syngas comprising hydrogen, carbon monoxide and carbon dioxide and often residual hydrocarbon material and small quantities of other gases. Furthermore, the apparatus comprises a combustion chamber of a gas turbine unit that receives the syngas and combusts the syngas and produces flue gases comprising carbon dioxide and other gases that are supplied to the gas turbine contained in the gas turbine unit. In addition, the apparatus includes a bottoming cycle unit of a combined cycle power plant that receives exhaust gases from the gas turbine and produces power and from which combustion gases exit. A carbon dioxide separator is also included in the apparatus that receives combustion gases exiting the bottoming cycle unit and separates carbon dioxide from the other combustion gases. A compressor is provided that supplies the separated carbon dioxide to the reformer for reforming the hydrocarbon material. Preferably, according to the present invention, the reformer comprises a solar reformer. In addition, the gas turbine unit includes a compressor that compresses air and also an electric generator coupled to the gas turbine that produces electricity. Moreover, the hydrocarbon material can preferably be chosen from the following group: methane, natural gas, landfill gas, biogas, etc, or other suitable material such as kerosene, liquid petroleum gas (LPG), etc.

In addition, the present invention includes a method for producing power comprising the following step of reforming a hydrocarbon material in a reformer for producing syngas comprising hydrogen, carbon monoxide and carbon dioxide. Furthermore, the method includes the step of supplying the syngas to the combustion chamber of a gas turbine unit that combusts the syngas and produces flue gases comprising carbon dioxide and other gases that are supplied to the gas turbine contained in the gas turbine unit. In addition, the method also includes the step of supplying exhaust gases exiting the gas turbine to a bottoming cycle unit of a combined cycle power plant for producing power and from which combustion gases exit. Furthermore, the method also includes the step of supplying the combustion gases to a carbon dioxide separator that separates carbon dioxide from the other combustion gases; and supplying the separated carbon dioxide to the reformer using a compressor for reforming the hydrocarbon material. Preferably, the compressor is electrically driven or driven by a generator shaft. E.g., the shaft of the gas turbine can drive the compressor. Additionally, preferably, the step of supplying the separated carbon dioxide to the reformer for reforming the hydrocarbon material can be carried out by supplying the separated carbon dioxide to a solar reformer.

Furthermore, when the separated carbon dioxide is supplied to a solar reformer, the solar energy is supplied as heat to the solar reformer by the sun during the daytime. During night-time, when no solar energy is available, the hydrocarbon material and separated carbon dioxide will continue to flow through the solar reformer without producing syngas by reforming the hydrocarbon material and the hydrocarbon material and separated carbon dioxide will be supplied to the combustion chamber of the gas turbine where combustion of the hydrocarbon material will take place.

BRIEF DESCRIPTION OF THE DRAWING

An embodiment of the present invention is described by way of example, and with reference to the accompanying drawing wherein the FIGURE is a schematic diagram of an embodiment of the present invention;

DETAILED DESCRIPTION

Turning to the FIGURE, numeral 10 designates apparatus of an embodiment of the present invention for producing mechanical power and/or electricity. As can be seen from the FIGURE, hydrocarbon material such as methane gas is supplied to solar reformer 12 that reforms the methane gas or hydrocarbon material and produces syngas comprising hydrogen, carbon monoxide and carbon dioxide and often residual methane. While methane gas is mentioned above as an example of the hydrocarbon material other hydrocarbon materials can be used. These are preferably chosen from the following group: methane, natural gas, landfill gas, biogas, various gasifier products, etc., or other suitable material such as kerosene, liquid petroleum gas (LPG), etc. The syngas is supplied to combustion chamber 14 of a gas turbine unit 15 where combustion of the syngas takes place and hot gases produced in the combustion chamber are supplied to gas turbine 20 contained in gas turbine unit 15 for producing power and/or electricity. Exhaust gas exhausted from gas turbine 20 is supplied to a means for extracting heat from said exhaust gases and producing heat depleted exhaust gases or combustion gases, i.e. a bottoming cycle unit 19 of combined cycle power plant 17 that produces power from which combustion gases exit. The bottoming cycle unit 19 may be a steam turbine unit or an organic Rankine cycle unit. These combustion gases are supplied to carbon dioxide separator 18 for separating carbon dioxide from the other gases and material present in the combustion gas. Once the carbon dioxide is separated, it is supplied to solar reformer 12 for reforming the hydrocarbon material using compressor 16 that compresses the separated carbon dioxide to a suitable pressure for supply into solar reformer 12. Compressor 16 can be electrically driven or driven by the shaft of a generator. If preferred, the shaft of gas turbine 20 can drive compressor 16 by e.g. mounting it on a suitable location on the shaft.

Thus, in operation hydrocarbon material, e.g. methane, is supplied to solar reformer 12 so that the methane gas is reformed and syngas containing hydrogen, carbon monoxide, carbon dioxide, etc., and usually residual methane, is produced. The syngas is supplied to combustion chamber 14 of gas turbine unit 15 where it is combusted. The hot gases produced therein are supplied to gas turbine 20 contained in gas turbine unit 15 where they are expanded and mechanical shaft power and/or electricity is produced if a generator is coupled to turbine 20. The exhaust gases exiting gas turbine 20 are now supplied to bottoming cycle unit 19 of combined cycle power plant 17 that produces mechanical shaft power and/or electricity if a generator is coupled to gas turbine 20. Combustion gases exiting bottoming cycle unit 19 are suppled to carbon dioxide separator 18 that separates the carbon dioxide ($CO_2$) from the rest of the gases present in the combustion gas. Thereafter, the separated carbon dioxide is supplied to solar reformer 12 using compressor 16 in order to reform the hydrocarbon material. During night-time, when no solar energy is available, the hydrocarbon material and separated carbon dioxide will continue to flow through the solar reformer without producing syngas by reforming the hydrocarbon material and the hydrocarbon material and separated carbon dioxide will be supplied to the combustion chamber of gas turbine 20 where combustion will take place. If preferred, extra syngas can be produced during the day and stored for use in the gas turbine combustion chamber at night.

It should be pointed out that the present invention and its method or process described herein is considered to be particularly effective for solar reforming. However, the present invention also contemplates operating the system of the present invention even if the reformer is not a solar reformer but rather a reformer that utilizes heat other than solar energy. In addition, the present invention reduces the emission of carbon dioxide ($CO_2$).

In addition, the present invention contemplates the use of other sources of carbon dioxide for operation in the solar reformer. In particular, carbon dioxide separated from flue gases or exhaust gases from combustion processes would be a suitable source of carbon dioxide for use in the solar reformer in accordance with the present invention. Non-limiting examples of such sources are exhaust gases of gas turbines, flue gases of steam boilers, flue gases of internal combustion engines, etc. In such a case, the flue gases or gases containing the carbon dioxide can be also supplied to carbon dioxide separator 18 for producing separated carbon dioxide. Alternatively, the carbon dioxide in the flue gases or other gases can be separated from the other gases in a further separator or other suitable apparatus. The resulting separated carbon dioxide can then be supplied by suitable means such as compressor 16 to solar reformer 12.

Moreover, it should be pointed out that, at present, the embodiment of the present invention described with reference to the figure is considered the best mode for carrying out the present invention.

In addition, it should be pointed out that the present invention includes as well the method for operating the apparatus disclosed with reference to above-described FIGURE.

It is believed that the advantages and improved results furnished by the method and apparatus of the present invention are apparent from the foregoing description of the invention. Various changes and modifications may be made without departing from the spirit and scope of the invention as described in the claims that follow.

What is claimed is:

1. A method for producing power comprising the steps of:
   (a) solar reforming a hydrocarbon material in a solar reformer for producing syngas comprising hydrogen, carbon monoxide and carbon dioxide;
   (b) supplying said syngas to the combustion chamber of a gas turbine unit that combusts the syngas and produces flue gases comprising carbon dioxide and other gases that are supplied to the gas turbine contained in the gas turbine unit;
   (c) supplying the exhaust gases exiting said gas turbine to a bottoming cycle unit of a combined cycle power plant for producing power and from which combustion gases exit;
   (d) supplying said combustion gases exiting said bottoming cycle unit to a carbon dioxide separator that separates carbon dioxide from the other combustion gases; and
   (e) supplying the separated carbon dioxide to said solar reformer using a compressor for reforming of said hydrocarbon material.

2. A method according to claim 1 wherein, at night time, said hydrocarbon material and said separated carbon dioxide are supplied to said combustion chamber.

3. A method according to claim 2 wherein, at night time, said hydrocarbon material and said separated carbon dioxide are supplied to said combustion chamber by way of said solar reformer.

4. Apparatus for producing power comprising:
   (a) a solar reformer for solar reforming a hydrocarbon material and producing syngas comprising hydrogen, carbon monoxide and carbon dioxide;
   (b) a combustion chamber of a gas turbine unit that receives said syngas and combusts the syngas and produces flue gases comprising carbon dioxide and other gases that are supplied to the gas turbine contained in the gas turbine unit;
   (c) a bottoming cycle unit of a combined cycle power plant that receives exhaust gases exiting said gas turbine and produces power and from which combustion gases exit;
   (d) a carbon dioxide separator that receives combustion gases exiting said bottoming cycle unit and separates carbon dioxide from other combustion gases; and
   (e) a compressor that supplies the separated carbon dioxide to said solar reformer for reforming of said hydrocarbon material.

5. Apparatus according to claim 4 wherein said combustion chamber receives at night time said hydrocarbon material and said separated carbon dioxide.

6. Apparatus according to claim 5 wherein said combustion chamber receives at night time said hydrocarbon material and said separated carbon dioxide by way of said solar reformer.

7. Apparatus for producing power comprising:
   (a) a reformer for reforming a hydrocarbon material and producing syngas comprising hydrogen, carbon monoxide and carbon dioxide;
   (b) a combustion chamber of a gas turbine unit that receives said syngas and combusts the syngas and produces flue gases comprising carbon dioxide and other gases that are supplied to the gas turbine contained in the gas turbine unit;
   (c) a bottoming cycle unit of a combined cycle power plant that receives exhaust gases exiting said gas turbine and produces power and from which combustion gases exit;
   (d) a carbon dioxide separator that receives combustion gases exiting said bottoming cycle unit and separate carbon dioxide from the other combustion gases; and (e) a compressor that supplies said separated carbon dioxide to said reformer for reforming of said hydrocarbon material.

8. Apparatus according to claim 7 wherein said reformer comprises a solar reformer.

9. Apparatus according to claim 7 wherein said gas turbine unit includes a compressor for compressing air.

10. Apparatus according to claim 7 wherein said gas turbine unit includes an electric generator coupled to the gas turbine for producing electricity.

11. Apparatus according to claim 3 wherein said compressor is driven by said gas turbine unit.

12. Apparatus according to claim 7 wherein said hydrocarbon material comprises natural gas.

13. Apparatus according to claim 7 wherein said hydrocarbon material comprises methane.

14. Apparatus according to claim 7 wherein said hydrocarbon material comprises landfill gas.

15. Apparatus according to claim 7 wherein said hydrocarbon material comprises biogas.

16. Apparatus for producing power comprising:
(a) a solar reformer for reforming a hydrocarbon material and producing syngas comprising hydrogen, carbon monoxide and carbon dioxide;
(b) a combustion chamber of a gas turbine unit that receives said syngas and combusts the syngas and produces flue gases comprising carbon dioxide and other gases that are supplied to the gas turbine contained in the gas turbine unit;
(c) a bottoming cycle unit of a combined cycle power plant that receives exhaust gases exiting said gas turbine and produces power and from which combustion gases exit;
(d) a carbon dioxide separator that receives combustion gases exiting said bottoming cycle unit and separates carbon dioxide and other combustion gases;
(e) a compressor that supplies the separated carbon dioxide to said reformer for reforming of said hydrocarbon material;
(f) a combustion apparatus that produces flue gases comprising carbon dioxide and other gases; and
(g) a further carbon dioxide separator that receives said flue gases exiting said combustion apparatus and produces separated carbon dioxide and other flue gases wherein said separated carbon dioxide is supplied to said solar reformer for reforming of said hydrocarbon material.

17. A method of producing power comprising the steps of:
(a) solar reforming a hydrocarbon material in a solar reformer for producing syngas comprising hydrogen, carbon monoxide and carbon dioxide;
(b) supplying said syngas to the combustion chamber of a gas turbine unit that combusts the syngas and produces flue gases comprising carbon dioxide and other gases that are supplied to the gas turbine contained in the gas turbine unit;
(c) supplying the exhaust gases exiting said gas turbine to a means for extracting heat from said exhaust gases and producing heat depleted exhaust gases or combustion gases;
(d) supplying said heat depleted exhaust gases or said combustion gases exiting said means for extracting heat from said exhaust gases to a carbon dioxide separator that separates carbon dioxide from the other combustion gases; and
(e) supplying the separated carbon dioxide to said solar reformer using a compressor for reforming of said hydrocarbon material.

18. Apparatus for producing power comprising:
(a) a solar reformer for solar reforming a hydrocarbon material and producing syngas comprising hydrogen, carbon monoxide and carbon dioxide;
(b) a combustion chamber of a gas turbine unit that receives said syngas and combusts the syngas and produces flue gases comprising carbon dioxide and other gases tha are supplied to the gas turbine contained in the gas turbine unit;
(c) a means for extracting heat from said exhaust gases that receives exhaust gases exiting said gas turbine and produces power and from which heat depleted exhaust gases or combustion gases exit;
(d) a carbon dioxide separator that receives said heat depleted exhaust gases or said combustion gases exiting said means for extracting heat from said exhaust gases and separates carbon dioxide from the other combustion gases; and
(e) a compressor that supplies said separated carbon dioxide to said solar reformer for reforming of said hydrocarbon material.

19. The method according to claim 17 wherein the step of supplying the exhaust gases exiting said gas turbine to a means for extracting heat from said exhaust gases and producing heat depleted exhaust gases or combustion gases is carried out by supplying the exhaust gases exiting said gas turbine to a bottoming cycle unit of a combined cycle power plant that receives said exhaust gases exiting said gas turbine and produces power and from which said heat depleted exhaust gases or combustion gases exit.

20. Apparatus according to claim 18 wherein said means for extracting heat from said exhaust gases comprises a bottoming cycle unit of a combined cycle power plant that receives said exhaust gases exiting said gas turbine and produces power and from which said heat depleted exhaust gases or said combustion gases exit.

* * * * *